April 16, 1963 G. M. LA POINTE 3,085,781
VALVE ACTUATOR

Filed Jan. 15, 1962 4 Sheets-Sheet 1

INVENTOR
GABRIEL M. LAPOINTE
BY *Norman S. Blodgett*
ATTORNEY

April 16, 1963  G. M. LA POINTE  3,085,781
VALVE ACTUATOR
Filed Jan. 15, 1962  4 Sheets-Sheet 2

INVENTOR
GABRIEL M. LAPOINTE

BY Norman S. Blodgett
ATTORNEY

April 16, 1963 G. M. LA POINTE 3,085,781
VALVE ACTUATOR
Filed Jan. 15, 1962 4 Sheets-Sheet 3

INVENTOR
GABRIEL M. LAPOINTE
BY Norman L. Blodgett
ATTORNEY

April 16, 1963     G. M. LA POINTE     3,085,781

VALVE ACTUATOR

Filed Jan. 15, 1962     4 Sheets-Sheet 4

INVENTOR
GABRIEL M. LAPOINTE

BY *Norman S. Blodgett*

ATTORNEY

United States Patent Office 3,085,781
Patented Apr. 16, 1963

3,085,781
VALVE ACTUATOR
Gabriel M. La Pointe, Worcester, Mass., assignor to R & A Machine Company, Inc., Worcester, Mass., a corporation of Massachusetts
Filed Jan. 15, 1962, Ser. No. 166,032
2 Claims. (Cl. 251—67)

This invention relates to a value actuator and more particularly to apparatus arranged to open and close a valve automatically.

It has been common practice in the past to open and close valves by using a motorized actuator operated either electrically, pneumatically or hydraulically. However, most of the known devices for opening and closing valves have suffered from certain handicaps. For instance, motor driven actuators have been quite expensive because of the use of reversible motors; also, no means has been provided for returning the valve to an inoperative position in the case of power failure. In many of these devices suitable provision has not been made for adjusting the operating cycle for opening and closing the valve. Furthermore, problems of inertia of the parts have resulted in devices which wore out rather rapidly. These and other difficulties experienced with the prior art devices have been obviated in a novel manner by the present invention.

It is an outstanding object of the invention to provide a valve actuator which operates automatically to return the valve to an inoperative condition upon loss of electrical power.

Another object of this invention is the provision of a valve actuator capable of moving a valve either to an operative position or to an inoperative position but which, nevertheless, requires only a one-direction electric motor.

A further object of the present invention is the provision of a valve actuator containing adjustable means for regulating the electrical energization of the actuating motor.

It is another object of the instant invention to provide a valve actuator in which the inertia of the motor is removed from the rotating system as the valve is returned to an inoperative position so that, when the valve reaches that position, the shock to the drive system will be minimized.

It is a further object of the invention to provide a valve actuator having a locking means for retaining the actuator in the operative position of the valve but which is released and permits the valve to be returned to an inoperative position upon a loss of electrical energy.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

In the description which follows, the expression "operative condition" will be used to refer to the normal position of a valve in a hydraulic system, which position may be either open or closed, while the expression "inoperative condition" will be used to refer to the opposite position of the valve, therefore, may also either be closed or open.

Figure 2:
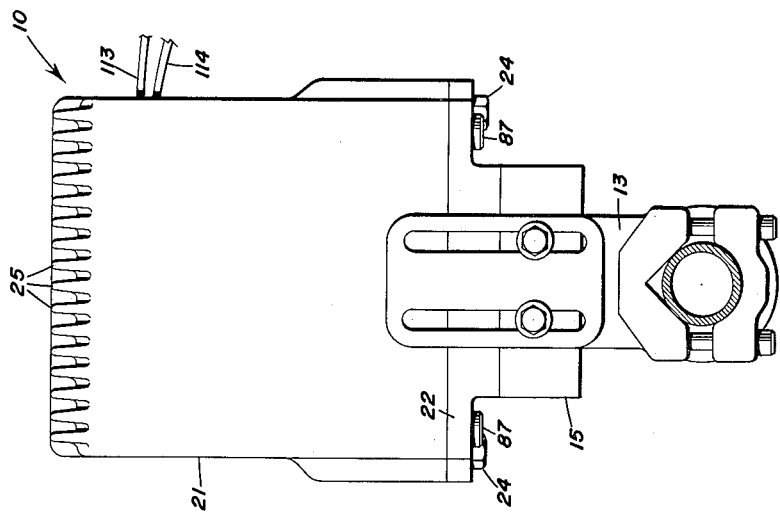
FIG. 2 is an end elevational view of the apparatus.
Figure 1:
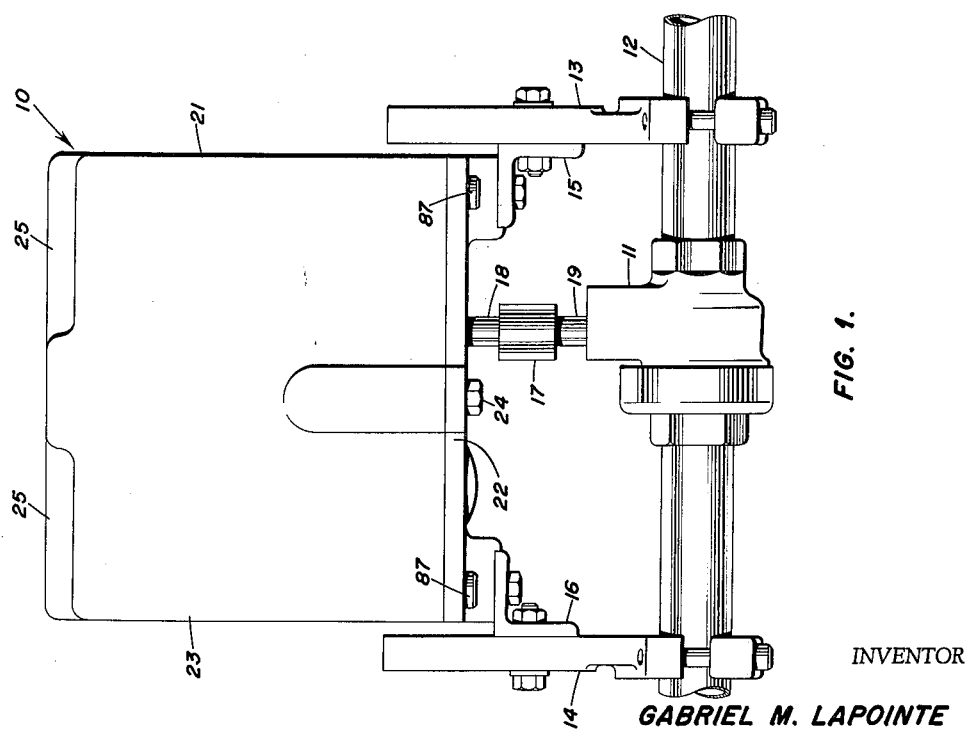
FIG. 1 is a side elevational view of the apparatus embodying the principles of the present invention.
Figure 3:
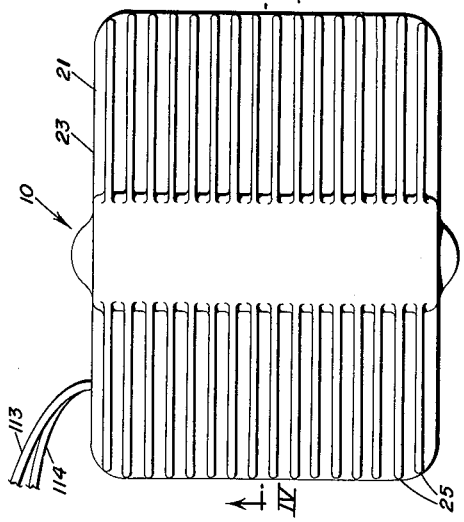
FIG. 3 is a plan view of the apparatus.

Referring first to FIGS. 1, 2, and 3, wherein are best shown the general features of the invention, it can be seen that the valve actuator, indicated generally by the reference numeral 10, is being used in conjunction with a ball valve 11 located in a pipe line 12. The actuator is supported on brackets 13 nad 14 which are clamped to the pipe line 12 on either side of the valve 11 and which carry adjustable shelves 15 and 16, respectively, which support the actuator and to which it is bolted. An adaptor 17 connects a vertical output shaft 18 of the actuator to the stem 19 of the valve. Movement of the stem 19 of the valve 11 through approximately 90° causes the valve to move from an inoperative condition to an operative condition, that is to say, either from "open" to "closed" or from "closed" to "open" conditions. The actuator 10 is provided with a housing 21 consisting of a base 22 through which the output shaft 18 extends and a cover 23. The cover is fastened to the base by means of bolts 24 and the base is in turn bolted to the shelves 15 and 16 of the brackets 13 and 14. The cover 23 is provided with deep ribs 25 at its upper end to assist in the dissipation of heat.

Figure 4:
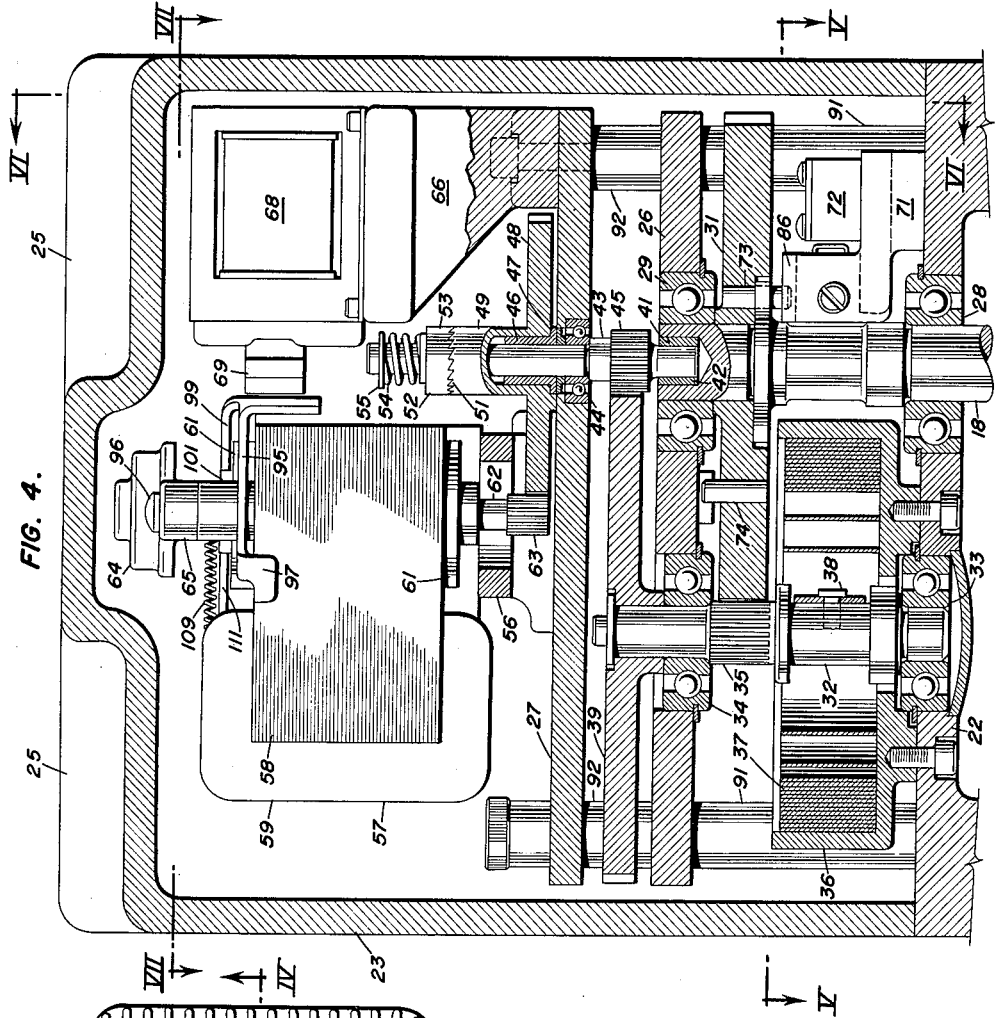
FIG. 4 is a sectional view of the apparatus taken on the line IV—IV of FIG. 3.

Referring now to FIG. 4, it can be seen that two horizontal shelves 26 and 27 are mounted on the base 22 and are arranged parallel to and spaced from the base as well as spaced vertically from one another. The output shaft 18 is mounted in a ball bearing 28 located in the base 22 and at the upper end in a ball bearing 29 located in the shelf 26. A large gear 31 is keyed to the shaft immediately under the shelf 26. A vertical shaft 32 is mounted at its lower end in a ball bearing 33 and at its upper end in a ball bearing 34 mounted in the shelf 26. Formed on the shaft 32 immediately under the bearing 34 is a small gear 35 which meshes with the larger gear 31 of the output shaft 18. Bolted to the upper surface of the base 22 is an upwardly-opening circular retainer 36 which carries a coil spring 37. The inner end of the coil spring 37 is fastened to the shaft 32 by a pin 38, while the other end is fastened to the inner surface of the retainer 36. The shaft 32 swings upwardly some distance above the upper surface of the shelf 26 and has attached to its upper end and keyed thereto a large gear 39.

The upward end of the output shaft 18 is level with the upper surface of the shelf 26 and is provided with a bore 41. In this bore is located a bushing 42 in which rests the lower end of a vertical shaft 43. The shaft 43 passes through and is mounted in a ball bearing 44 mounted in the upper shelf 27. Formed on the shaft 43 between the shelf 27 and the shelf 26 is a small gear 45 which meshes with the large gear 39 of the shaft 32. The shaft 43 extends above the upper surface of the upper shelf 27 a considerable distance and on the upper portion of the shaft just above the upper shelf 27 is a bushing 46 having on its lower end an outwardly extending flange 47. Rotatably mounted on the bushing 46 is a large gear 48. The gear is provided with a tubular upstanding hub 49 which is provided at its upper end with upwardly-extending teeth 51. Keyed to the shaft 43 above the hub 49 is a sleeve 52 having downwardly-extending teeth 53 which are adapted to engage the teeth 51. The sleeve 52, although it is keyed to the shaft 43, is capable of longitudinal motion therealong and is pressed toward the hub 49 by a coil spring 54 which is compressed between the top of the sleeve 52 and a stop plate 55 fastened to the upper end of the shaft 43.

Mounted on the upper surface of the shelf 27 is a platform 56 which straddles the large gear 48. On this platform is mounted an electric motor 57 of the uni-directional type having a stator 58 provided with a field coil 59. Extending through the stator is a rotor 61 from the lower end of which extends a rotor shaft 62. On the lower end of the shaft is mounted a small gear 63 which meshes with the large gear 48. The upper end of the shaft 62 extends well above the top of the stator 58 and is carried in a bearing cap 64 which in turn is mounted on a bridge 65 bolted to the top of the stator.

Also mounted on the upper surface of the shelf 27 is a pedestal 66 on top of which is mounted a solenoid 67 having a coil 68 and a plunger 69 which is spring-biased to its outermost position and is withdrawn into the solenoid by energization of the coil 68.

Mounted on the upper surface of the base 22 is a support 71 on which is mounted a limit switch 72. Mounted on the large gear 31 and extending downwardly therefrom is a pin 73 for actuating the switch. At the opposite sides of the gear is mounted another pin 74 for limiting movement of the valve actuator by engagement with a block mounted on the underside of the shelf 26.

Figure 5:
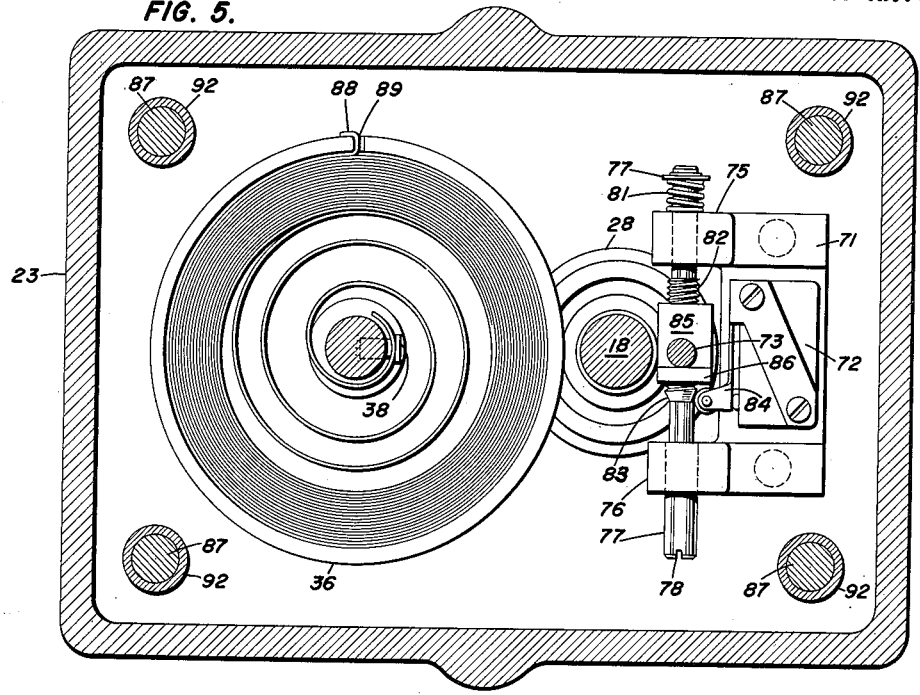
FIG. 5 is a horizontal sectional view of the apparatus taken on the line V—V of FIG. 4.

Referring now to FIG. 5, it can be seen that the support 71 is provided with vertically upstanding abutments 75 and 76 in which is mounted for sliding movement a horizontal switch-actuating shaft 77. The shaft extends through the abutments 75 and 76 and at one end is provided with a screw driver slot 78, while at the other end is provided with a stop plate 79 and a coil spring 81. The center of the shaft is provided with an enlarged threaded portion 82 having a conical transition surface 83 at the end closest to the abutment 76. This transition surface is located close to the actuating member 84 of the switch 72. Resting on the upper surface of the support 71 between the abutments 75 and 76 is a block 85 through which the enlarged portion 82 of the shaft 77 is threaded. An abutment 86 extends vertically upwardly from the end of the block 85 adjacent the transition surface 83. This abutment extends upwardly far enough to make contact with the pin 73 on occasion. Incidentally, this view of the device shows particularly well the four corner posts 87 on which the shelves 26 and 27 are mounted. Also, in this view can be seen the manner in which the other end of the spring 37 is fastened to the retainer 36 by means of a hook 88 formed in its end and engaging a slot 89 in the retainer.

Figure 6:
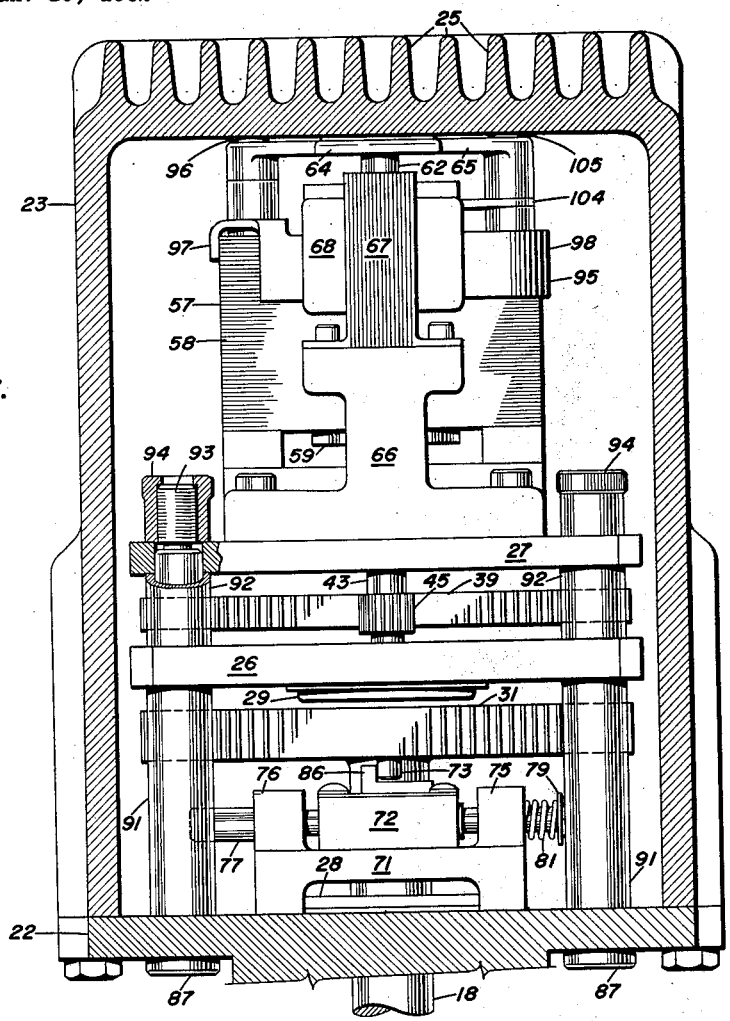
FIG. 6 is a vertical sectional view of the apparatus taken on the line VI—VI of FIG. 4.

FIG. 6 shows the manner in which the shelves 26 and 27 are mounted on the posts 87. Between the upper surface of the base 22 and the under surface of the shelf 26 a sleeve 91 surrounds the post and supports the shelf. Between the shelf 26 and the shelf 27 a sleeve 92 surrounds each post and serves to support and separate the shelves. Then, the upper end of each post is provided with a threaded portion 93 on which a nut 94 is mounted which holds all of the elements together to form a unitary structure.

Figure 7:
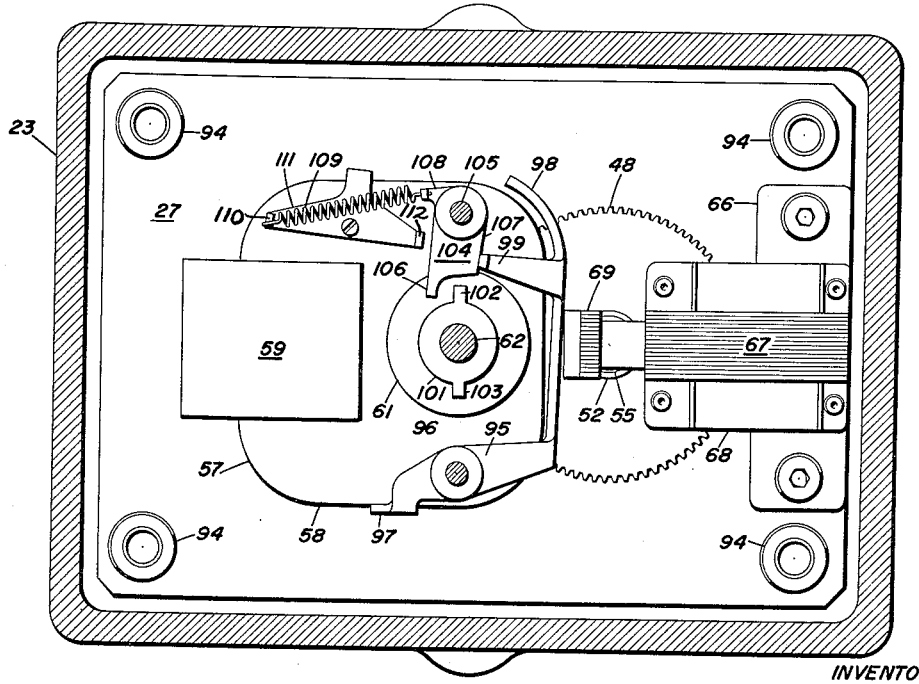
FIG. 7 is a horizontal sectional view of the apparatus taken on the line VII—VII of FIG. 4.

Referring now to FIG. 7, it can be seen that the stator 58 of the motor 57 has hingedly attached to its upper surface a stamped metal lever 95 which is pivoted around a bolt 96 which also serves to fasten the bridge 65 to the top of the motor. The lever 95 is provided with a finger 97 which extends downwardly around the side surface of the rotor or stator 58 and permits only a small pivotal movement of the lever. The lever is provided with a broad curved body 98 which fits around the side and corners of the stator 58 which are adjacent the solenoid 67. The lever is formed of magnetic material such as steel so that it will be attracted to the stator when the motor is energized. Extending away from the body in a generally horizontal direction from its upper edge is a finger 99, the finger being located on the opposite side of the rotor 61 from the pivot bolt 96. Fastened to the shaft 62 of the rotor 61 is a collar 101 having radial, diametrically-opposed fingers 102 and 103. The collar 101 and its fingers are formed of nylon or some other hard, wear-resistant material and it is suitably fastened to the shaft so that it rotates with it. A latch member 104 is pivotally attached to a bolt 105 by which the other side of the bridge 65 is attached to the top surface of the motor. The latch member is provided with a finger 106 which is capable of residing close to the periphery of the collar 101 and engaging one of the fingers 102 and 103. It is provided with a shoulder 107 capable of being readily engaged by the finger 99 and also with a finger 108 to which is attached a coil spring 109. The other end of the coil spring is attached to an abutment 110 extending upwardly from one end of a stamped metal plate 111 which is bolted to the upper surface of the stator 58. At the other end the plate 111 is provided with a stop 112 which serves to limit the pivotal movement of the latch member 104. The latch member 104 is also made of a wear-resistant material such as nylon.

Figure 8:
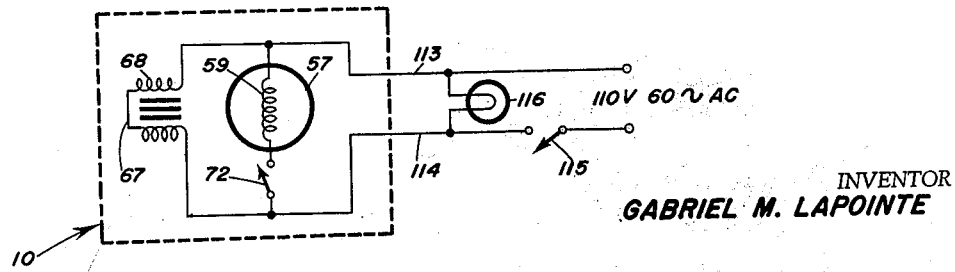
FIG. 8 is a schematic diagram of the electrical equipment associated with the apparatus.

FIG. 8 shows the electrical arrangement used in the apparatus. Two lines 113 and 114 enter the apparatus and are connected to a source of alternating current electricity. Connected directly across these lines is the coil 68 of the solenoid 67. Also connected in series with one another from one line to the other is the field coil 59 of the motor 57 and the limit switch 72. Externally of the apparatus the user may furnish the apparatus with a power switch 115 and an indicating light 116.

The operation of the apparatus will now be readily understood in view of the above description. Let us suppose that the valve actuator 10 is to be used with the valve 11 in such a manner that the operative position will be when the valve is open and the inoperative position will be when the valve is closed. Such a situation may exist, for example, in an oil line going to the oil burner of the furnace. Since, in such cases it is not only desirable to open and shut the valve to control the flow of oil to the burner under ordinary circumstances, but it is very desirable that, when electrical power is lost, the oil flow be stopped. This would be because the loss of electrical power would mean that ignition of the oil would be uncertain because of the fact that electric igniters are often used with such oil burners. It would then be desirable that, when power is lost, the valve 11 be closed. Let us, then, suppose that the valve is in closed position at the beginning of the cycle. The operator closes the switch 115 thus introducing power into the system. First of all, the solenoid 67 is energized and its plunger is retracted. The motor 57 is also energized and the first power to its coil 59 causes a magnetic field around the stator 58 and this attracts the lever 95 and causes the body 98 to lie closly against the side of the stator. At that time the finger 99 contacts the shoulder 107 on the latch member 104 and causes it to be pivoted in a counter-clockwise direction in FIG. 7 away from any contact with the collar 101 or its fingers 102 and 103. The energization of the motor causes the rotor 61 and the shaft 62 to rotate, carrying the small gear 63 with them, this gear being in engagement with the large gear 48 causing it to turn. Power is transmitted between the teeth 51 of the hub 49 and the teeth 53 of the sleeve 52. Since the sleeve 52 is keyed to the shaft 43, this shaft rotates also, carrying with it the small gear 45. The small gear 45 is in engagement with the large gear 39 and this, in turn, rotates the shaft 32. Thus, as the rotor of the motor continues to rotate, the spring 37 is wound up. At the same time that the shaft 32 is winding the spring 37, its small gear 35 is rotating in engagement with the large gear 31 which is keyed to the output shaft 18. The output shaft, of course, rotates at a very slow speed due to the gear reduction through the drives and the valve is slowly opened. Eventually, the gear 31 rotates in a clockwise direction looking downward and the pin 73 soon strikes the abutment 86 on the block 85. Continued pressure of this pin causes the shaft 77 to slide in its mounting in the abutments 75 and 76 overcoming the resistance of the coil spring 81. Finally, the conical transition surface 83 contacts the actuating member 84 of the limit switch 72 and opens the switch. The moment when this takes place is adjusted so that the switch is opened at the exact moment that the valve is completely open. This adjustment can be made by rotating the shaft 77 by means of the screwdriver slot 78, thus adjusting the position of the block 85 transversely of the apparatus so that the pin 73 causes the transition surface to contact the actuating member 84 of the switch sooner or later, depending on the direction in which the shaft 77 has been screwed through the block. As soon as the switch 72 has been opened, the motor stops because no current is flowing through its coil 59, although the current continues to flow through the coil 68 of the solenoid 67 so that its plunger 69 is drawn inwardly. Since the stator of the motor no longer attracts the lever 95, it cannot prevent the latch member 104 from rotating in the direction that it is urged by the coil spring 109 and, thus, force the body 98 of the lever away from the stator 58 of the motor. At the same time, the latch member swings counter-clockwise in FIG. 7 and comes into the range of the fingers 102 and 103 of the motor. The moment that the motor is no longer energized, the spring 37, of course, exerts torque on the gear reduction apparatus to try to rotate the rotor 61 of the motor in the opposite direction, but the latch member 104 almost immediately contacts one of the fingers 102 and 103 and prevents the reverse rotation of the motor rotor. The apparatus remains in this condition as long as it is desirable to have the valve open. Interruption of the current into the apparatus, however, will cause the valve to shut. This can be accomplished either by the operator opening the switch 115 or by a loss of power. In either case, the loss of power to the coil 68 of the solenoid 67 causes its plunger to move outwardly toward the lever 95 under the impetus of the spring bias that is built into the solenoid. When this occurs, the lever body 98 is thrown against the stator 58 of the motor and the finger 99 contacts the shoulder 107 of the latch member 104 and forces the latch member to rotate counter-clockwise very rapidly. This action releases the fingers 102 and 103 of the collar 101 that the latch member was until that moment contacting and the motor rotor 61 is free to rotate. It does this because of the energy stored in the spring 37. The spring acts through the shaft 32, the small gear 35, the large gear 31, and the output shaft 18 to close the valve. At the same time that the output shaft 18 is being rotated, the spring is also rotating the shaft 32 and working through the large gear 39, the small gear 45, and the shaft 43 to transmit power through the sleeve 52, the large gear 48, and the small gear 63 to rotate the motor rotor. The motor rotor rotates along with the other elements at a very rapid rate until, eventually, the valve is closed. At that time it is arranged that the pin 74 of the large gear 41 strike a block which is fastened to the lower surface of the shelf 26 and this block is arranged and adjusted so that the pin 74 strikes it just as the valve reaches its closed position. The sudden stopping of the gear 31 makes itself felt through the small gear 35, the shaft 32, the large gear 39, the small gear 45 and the shaft 43 to the position of the sleeve 52. Since the motor rotor has considerable inertia, it wishes to continue to rotate, and the sudden stopping of the sleeve 52 causes the teeth 51 and 52 to slide relative to one another. The motor rotor with its large inertia continues to drive the shaft 62, the small gear 63, and the large gear 48 along with the hub 49. However, as is evident in FIG. 4, the teeth 51 and 52 and 53 are so made that their inclined surfaces permit the hub 49 to proceed ahead of the sleeve 52 or, in other words, over-ride it. The camming of the inclined surfaces of the teeth in this manner causes a compression of the coil spring 54 against its stop plate 55, but there is no transmittal of energy from the rotating motor rotor into the shaft 43 and down through the system into the valve. The motor continues to rotate until its bearing friction slows it down and brakes it to a stop. It can be seen that the separation of the motor rotor from the rest of the system prevents damage to the parts because of the high inertia.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A valve actuator, comprising an output shaft adapted to be connected to the valve stem, an electric motor, a speed reduction means connecting the motor the shaft for moving the valve from an inoperative condition to an operative condition, a storage spring connected to the motor to store energy while the motor is moving the valve to operative condition, the spring biasing the speed reduction means so as to move the valve from operative condition to inoperative condition, a switch controlling the flow of electricity to the motor, a contactor associated with the speed reduction means located so as to strike and to open the switch when the valve reaches operative condition, an electrically-operated lock which when energized prevents the spring from acting to move the valve from operative to inoperative condition, and an over-running clutch associated with the speed reduction means to disconnect the portion of the speed reduction means connecting the spring to the shaft from the motor when the valve has reached the inoperative condition, the clutch consisting of an intermediate shaft connected to the output shaft, a member rotatable on the intermediate shaft, a sleeve slidable but not rotatable relative to the intermediate shaft, a spring pressing the sleeve into engagement with the member, the member and sleeve being formed with engaging teeth each with an inclined surface on one side and a surface extending axially of the intermediate shaft on the other side.

2. A valve actuator, comprising an output shaft adapted to be connected to a valve stem, an electric motor, a speed reduction means connecting the motor to the shaft for moving the valve from an inoperative condition to an operative condition, a storage spring connected to the motor to store energy while the motor is moving the valve to operative condition, the spring acting to move the valve from operative condition to inoperative condition, a switch controlling the flow of electricity to the motor, a contactor associated with the speed reduction means located to open the switch when the valve reaches operative condition, an electrically-operated lock which when energized prevents the spring from moving the valve from operative to inoperative condition, the lock consisting of a solenoid with the plunger normally spring-biased when not energized away from the motor, a collar with an outwardly-extending finger fastened to the motor shaft, a latch member rotatably mounted near the collar and spring biased to a contact with the collar finger, a lever mounted on the motor and held in position by magnetic attraction when the motor is energized, the lever having a finger which engages the latch member and maintains it out of engagement with the collar finger when the motor is energized, an over-running clutch associated with the speed reduction means to disconnect the portion of the speed reduction means connecting the spring to the shaft from the motor when the valve has reached the inoperative condition, the clutch consisting of an intermediate shaft connected to the output shaft, a member rotatably mounted on the intermediate shaft, a sleeve slidable but not rotatable relative to the intermediate shaft, a spring pressing the sleeve into engagement with the member, the member and sleeve being formed with engaging teeth each with an inclined surface on one side and a surface extending axially of the intermediate shaft on the other side, a support on which the switch is mounted, a shaft mounted on the support for motion in the direction of its length, the last-named shaft having a threaded portion, a block mounted on the threaded portion in position to be engaged by the contactor, a spring resisting movement of the said last-named shaft, a portion of the shaft being formed to actuate the switch when the shaft is moved in the direction of its length.

References Cited in the file of this patent

UNITED STATES PATENTS

| | | |
|---|---|---|
| Re. 19,445 | Chandler | Feb. 5, 1935 |
| 2,203,233 | Panish | June 4, 1940 |
| 2,904,956 | Zenor | Sept. 22, 1959 |